United States Patent
Kobayashi et al.

(10) Patent No.: US 6,904,096 B2
(45) Date of Patent: Jun. 7, 2005

(54) VIDEO DATA PROCESSING DEVICE AND VIDEO DATA PROCESSING METHOD

(75) Inventors: Hiroshi Kobayashi, Kanagawa (JP); Kyoko Fukuda, Kanagawa (JP); Masami Tomita, Chiba (JP); Katsunari Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 09/879,535

(22) Filed: Jun. 12, 2001

(65) Prior Publication Data

US 2002/0097335 A1 Jul. 25, 2002

(30) Foreign Application Priority Data

Jun. 13, 2000 (JP) .......................................... 2000-177647
Jul. 10, 2000 (JP) .......................................... 2000-208936

(51) Int. Cl.$^7$ .............................. H04N 7/14; H04B 1/66
(52) U.S. Cl. .............................. 375/240.26; 348/384.1
(58) Field of Search ........................ 375/240.25–240.29, 375/240.01, 240.02, 240.03, 240.12, 24.04; 348/384.1; H04N 7/12; H04B 1/66

(56) References Cited

U.S. PATENT DOCUMENTS 4,609,941 A * 9/1986 Carr et al. ............. 375/240.12
6,363,114 B1 * 3/2002 Kato ..................... 375/240.04
6,466,625 B1 * 10/2002 Kobayashi et al. .... 375/240.29

* cited by examiner

Primary Examiner—Tung Vo
(74) Attorney, Agent, or Firm—Frommer Lawrence & Haug LLP; William S. Frommer; Darren M. Simon

(57) ABSTRACT

The image quality of video data is remarkably improved by a video data processing device and a video data processing method according to the invention. The input video data is adaptively filtered by adaptive filter 35 at the time coding as a function of the degree of coding difficulty of image and the decoded video data is adaptively compensated by adaptive image quality correcting circuit 50 as a function of the degree of coding difficulty of image to reduce the coding noise and appropriately correct the image quality.

21 Claims, 15 Drawing Sheets

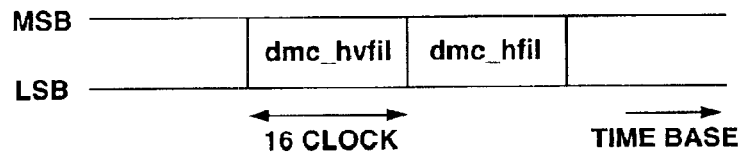

FIG.7

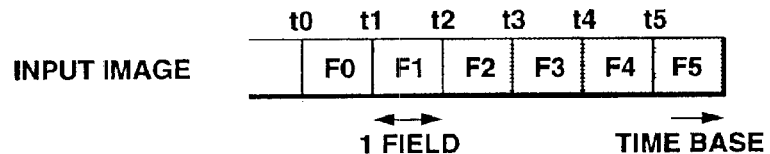

FIG.8A  INPUT IMAGE

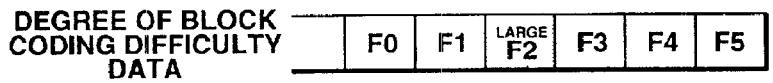

FIG.8B  DEGREE OF BLOCK CODING DIFFICULTY DATA

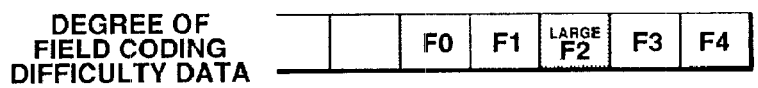

FIG.8C  DEGREE OF FIELD CODING DIFFICULTY DATA

FIG.8D  SCENE CHANGE DETECTION SIGNAL

FIG.8E  IMAGE DATA READ OUT FROM FIELD MEMORY

FIG.8F  DEGREE OF BLOCK CODING DIFFICULTY READ OUT FROM FIELD MEMORY

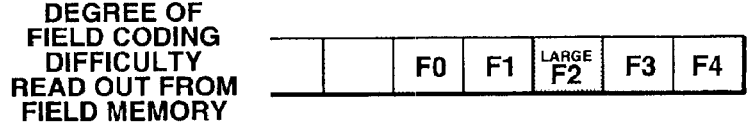

FIG.8G  DEGREE OF FIELD CODING DIFFICULTY READ OUT FROM FIELD MEMORY

FIG.8H  SCENE CHANGE READ OUT FROM FIELD MEMORY

FIG.11A  INPUT IMAGE 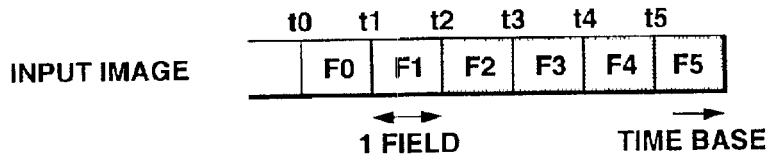

FIG.11B  DEGREE OF BLOCK CODING DIFFICULTY DATA 

FIG.11C  DEGREE OF FRAME CODING DIFFICULTY DATA 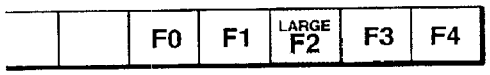

FIG.11D  SCENE CHANGE DETECTION SIGNAL 

FIG.11E  IMAGE DATA READ OUT FROM FRAME MEMORY 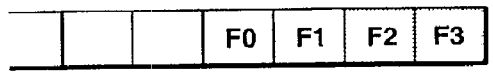

FIG.11F  DEGREE OF BLOCK CODING DIFFICULTY READ OUT FROM FRAME MEMORY 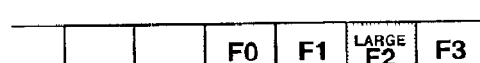

FIG.11G  DEGREE OF FIELD CODING DIFFICULTY READ OUT FROM FRAME MEMORY 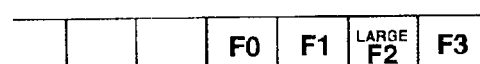

FIG.11H  SCENE CHANGE READ OUT FROM FRAME MEMORY 

| DEGREE OF BLOCK CODING DIFFICULTY | FILTER COEFFICIENT α | | | | |
|---|---|---|---|---|---|
| | Tab.15 | Tab.14 | ⋯ | Tab.1 | Tab.0 |
| 15 | 15/16 | 15/16 | | 6/16 | 0/16 |
| 14 | 15/16 | 15/16 | | 5/16 | 0/16 |
| 13 | 14/16 | 14/16 | | 5/16 | 0/16 |
| 12 | 14/16 | 13/16 | | 4/16 | 0/16 |
| 11 | 13/16 | 13/16 | | 3/16 | 0/16 |
| 10 | 13/16 | 12/16 | | 2/16 | 0/16 |
| ⋯ | | | | | |
| 2 | 3/16 | 2/16 | | 0/16 | 0/16 |
| 1 | 2/16 | 1/16 | | 0/16 | 0/16 |
| 0 | 0/16 | 0/16 | | 0/16 | 0/16 |

FIG.12

| DEGREE OF FIELD CODING DIFFICULTY | TABLE NUMBER (Table No.) | | | | |
|---|---|---|---|---|---|
| | 10Mbps | 8Mbps | ... | 4Mbps | 2Mbps |
| 15 | 0 | 1 | | 12 | 15 |
| 14 | 0 | 1 | | 11 | 15 |
| 13 | 0 | 1 | | 11 | 14 |
| 12 | 0 | 1 | | 11 | 13 |
| 11 | 0 | 1 | | 9 | 12 |
| 10 | 0 | 0 | | 8 | 11 |
| ... | | | | | |
| 2 | 0 | 0 | | 1 | 3 |
| 1 | 0 | 0 | | 0 | 2 |
| 0 | 0 | 0 | | 0 | 0 |

FIG.13

| FIELD NUMBER WITH DEGREE OF CODING DIFFICULTY Kp_Fi | n | n+1 | n+2 | ... | n+16 | n+17 | n+18 | n+19 | n+20 | n+21 | n+22 | n+23 | n+24 | n+25 | n+26 | n+27 | n+28 | n+29 | n+30 | n+31 |
|---|---|---|---|---|---|---|---|---|---|---|---|---|---|---|---|---|---|---|---|---|
| | | | | | STILL IMAGE | | | | | | | | | | | | | | | |

| ATTENUATED VALUE d OF DEGREE OF CODING DIFFICULTY | 0 | 0 | 0 | ... | 2 | 4 | 6 | 8 | 10 | 10 | 10 | 10 | 8 | 6 | 4 | 2 | 0 | 0 | 0 | 0 |
|---|---|---|---|---|---|---|---|---|---|---|---|---|---|---|---|---|---|---|---|---|

FIG.15

VIDEO DATA PROCESSING DEVICE AND VIDEO DATA PROCESSING METHOD

BACKGROUND OF THE INVENTION

1. Field of the Invention

This invention relates to a video data processing device and a video data processing method that can suitably be used for a recording/reproduction apparatus adapted to compression-coding input video data and recording them on an optical disc.

2. Related Background Art

Compression-coding conforming to the MPEG (Moving Picture Experts Group) Standard is known. With compression-coding conforming to the MPEG Standard, the amount of video data to be handled is reduced by utilizing spatial correlations of data in a same frame and temporal correlations of data in different frames.

Therefore, the recording/reproduction apparatus using a coding system conforming to the MPEG Standard compression-codes the input video data to generate compression-coded video data and record them on an optical disc. For data reproduction, the recording/reproduction apparatus reproduces the compression-coded data from the optical disc and expansion-decodes the data to restore the original video data. In this way, the recording/reproduction apparatus can efficiently records a vast amount of video data on the optical disc by suing a coding system conforming to the MPEG Standard.

Some of the recording/reproduction apparatus of the above described type are adapted to always output a predetermined volume of compression-coded data by adaptively filtering the video data to be compression-coded before the compression-coding operation. More specifically, of the frames of the video data to be compression-coded, those that show a weak temporal correlation are subjected to an operation of reducing the high frequency component of the frame before the compression-coding process whereas those that show a strong temporal correlation are compression-coded without being subjected to a reduction of the high frequency component.

Thus, with such a recording/reproduction apparatus, if the volume of compression-coded video data is expected to increase because the temporal inter-frame correlation is low, the volume of information of the high frequency component is reduced before compression-coding the video data so as to always output a predetermined volume of compression-coded data because the image quality is not remarkably degraded to the sight of the viewer if the volume of the high frequency component of information is reduced.

However, if the image compression rate is raised, the volume of the high frequency component can be reduced to such an extent that the degradation of the sharpness of the reproduced image is recognizable to the sight of the viewer. The operation of reducing the volume of the high frequency component is conducted in the coding preprocessing step or in the coding processing step. Then, an operation of compensating the reduced volume of the high frequency component is conducted after the decoding processing step.

However, when the video data to be compression-coded is adaptively filtering before the compression-coding operation, the degree of filtering can vary depending on the image to be filtered. Therefore, if the operation of compensating the reduced volume of the high frequency component is conducted uniformly after the decoding processing step, some of the images to be compensated can be compensated inadequately.

BRIEF SUMMARY OF THE INVENTION

In view of the above identified problem, it is therefore the object of the present invention to provide a video data processing device and a video data processing method that can improve the quality of output images if compared with conventional apparatus and methods.

According to the invention, the above object is achieved by adaptively filtering video data at the time of coding as a function of the degree of difficulty of coding and adaptively compensating the video data after the decoding processing step as a function of the degree of difficulty of coding of the video data in order to reduce the coding noise and adequately correct the image quality.

More specifically, in an aspect of the present invention, there is provided a video data processing device comprising:

a degree of coding difficulty computing means for computing the degree of coding difficulty from the input video data;

a filtering means for adaptively filtering said input video data on the basis of the degree of coding difficulty computed from said input data;

a compression-coding means for compression-coding said input and filtered video data;

a decoding means for decoding said compression-coded video data;

a degree of coding difficulty computing means for computing the degree of coding difficulty from said decoded video data; and an image quality correcting means for adaptively correcting the image quality of said decoded video data on the basis of the degree of coding difficulty computed from said decoded video data.

In another aspect of the invention, there is provided a video data processing method comprising steps of:

computing the degree of coding difficulty from the input video data;

adaptively filtering said input video data on the basis of the degree of coding difficulty computed from said input data;

compression-coding said input and filtered video data;

decoding said compression-coded video data;

computing the degree of coding difficulty from said decoded video data; and adaptively correcting the image quality of said decoded video data on the basis of the degree of coding difficulty computed from said decoded video data.

Thus, according to the invention, the coding noise can be reduced by adaptively filtering video data at the time of coding as a function of the degree of difficulty of coding and the image quality can be adequately corrected by adaptively compensating the video data after the decoding processing step as a function of the degree of difficulty of coding of the video data. Additionally, the amount of information can be effectively reduced by adaptively filtering the video data, using the degree of coding difficulty of the entire image and that of each of selected local areas of the image.

Therefore, according to the invention, there are provided a video data processing device and a video data processing method that can improve the quality of output images if compared with conventional apparatus and methods.

BRIEF DESCRIPTION OF THE SEVERAL VIEWS OF THE DRAWING

FIG. 7 is a schematic illustration of the multiplexing operation of the noise reduction circuit of FIG. 2;

FIG. 8 is a schematic illustration of the timings of writing data in and those of reading data from the field memory of said noise reduction circuit of FIG. 2;

FIG. 11 is a schematic illustration of the timing of writing a data in and that of reading a data from the frame memory of said noise reduction circuit of FIG. 2;

FIG. 12 is a schematic illustration of the relationship between the filter coefficient and the degree of block coding difficulty that can be used for the purpose of the invention;

FIG. 13 is a schematic illustration of the relationship between the table for selecting said filter coefficient and the degree of field coding difficulty;

FIG. 15 is a timing chart illustrating the change in the attenuation of the degree of coding difficulty.

DETAILED DESCRIPTION OF THE INVENTION

Now, the present invention will be described by referring to the accompanying drawing that illustrate preferred embodiments of the invention.

Figure 1:
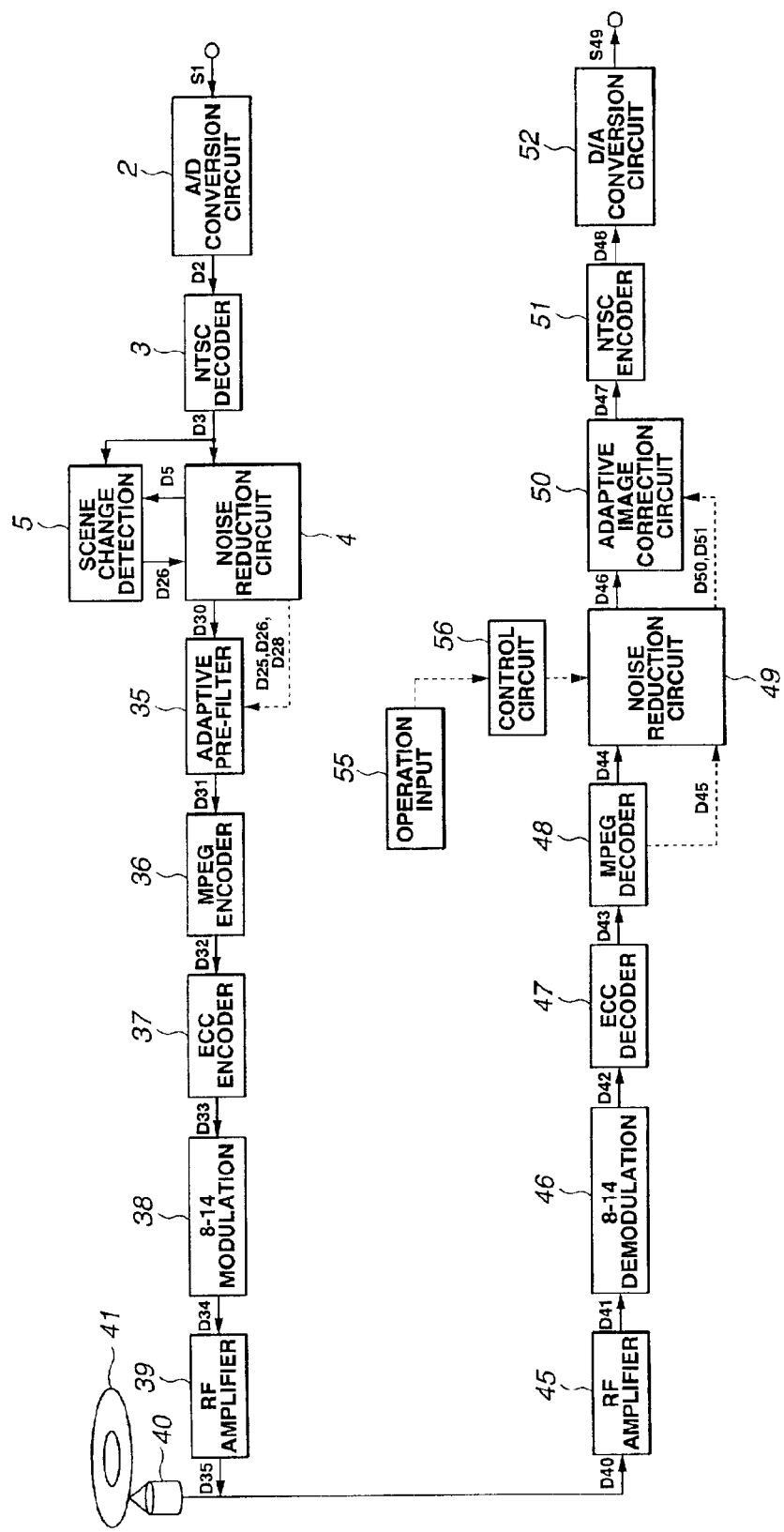
FIG. 1 is a schematic block diagram of a recording/reproduction apparatus realized by applying the present invention.

The present invention is typically applied to a recording/reproduction apparatus 1 having a configuration as shown in the block diagram of FIG. 1.

Referring to FIG. 1, this recording/reproduction apparatus 1 is so designed as to receiving an NTSC(National Television System Committee) video signal S1 from the outside through analog/digital (A/D) conversion circuit 2 and then the video data D2 obtained by the A/D conversion of the A/D conversion circuit 2 is sent out from the A/D conversion circuit 2 to NTSC decoder 3. The NTSC decoder 3 separates the luminance signal and the color signal of the NTSC video data D2 from each other and transmits the video data D3 including the luminance signal and the color signal that are separated from each other to noise reduction circuit 4 and scene change detection circuit 5.

Figure 2:
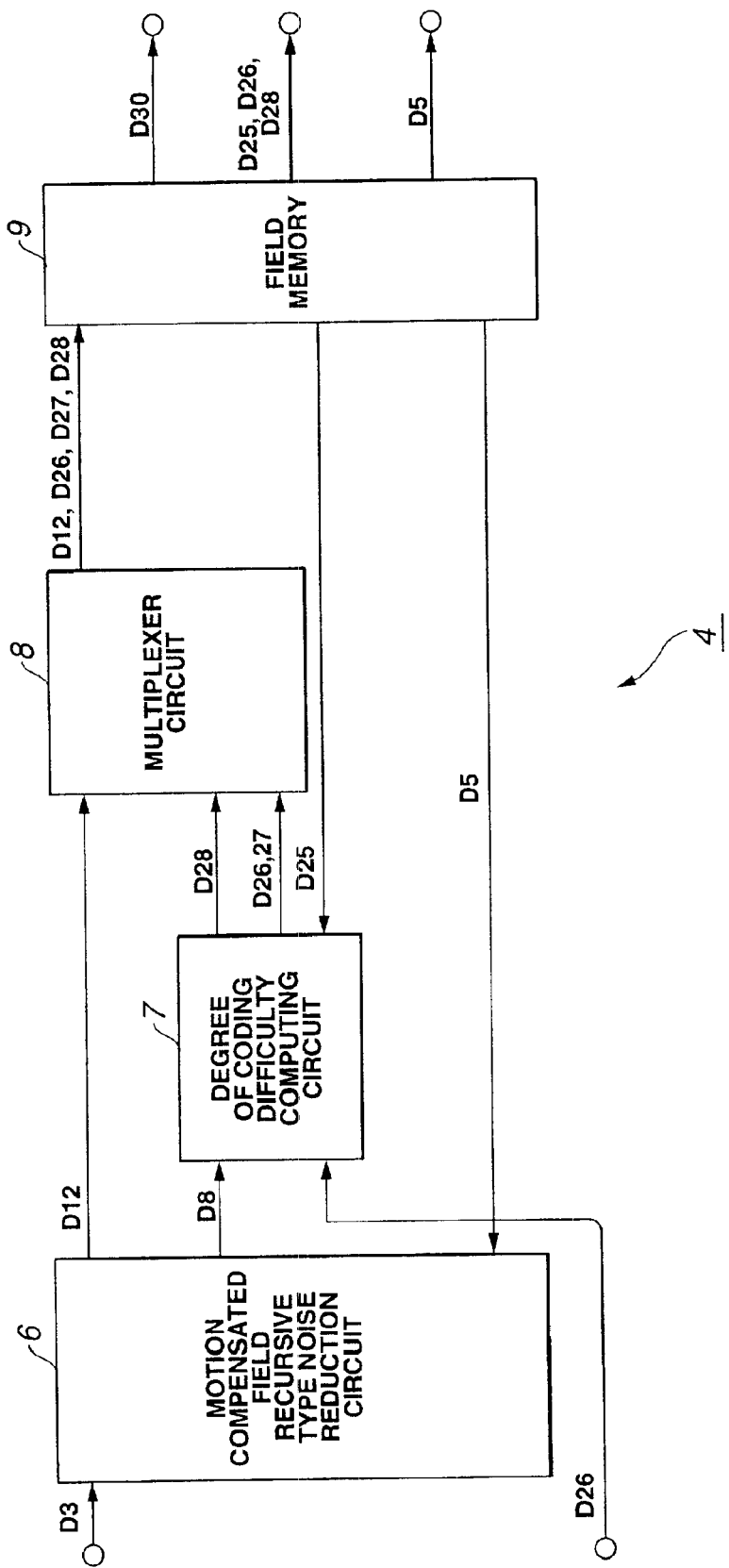
FIG. 2 is a schematic block diagram of the noise reduction circuit arranged in the recording/reproduction apparatus of FIG. 2.

Referring now to FIG. 2, the noise reduction circuit 4 comprises a motion compensated field recursive type noise reduction circuit 6, a degree of coding difficulty computing circuit 7, a multiplexer circuit 8 and a field memory 9. The noise reduction circuit 4 is so designed that the video data D3 from the NTSC detector 3 is supplied to the motion compensated field recursive type noise reduction circuit 6 whereas the scene change data D26 indicating if there is a scene change in the video data D3, which may typically be those of a movie picture or television drama, or not is supplied to the degree of coding difficulty computing circuit 7.

Figure 3:
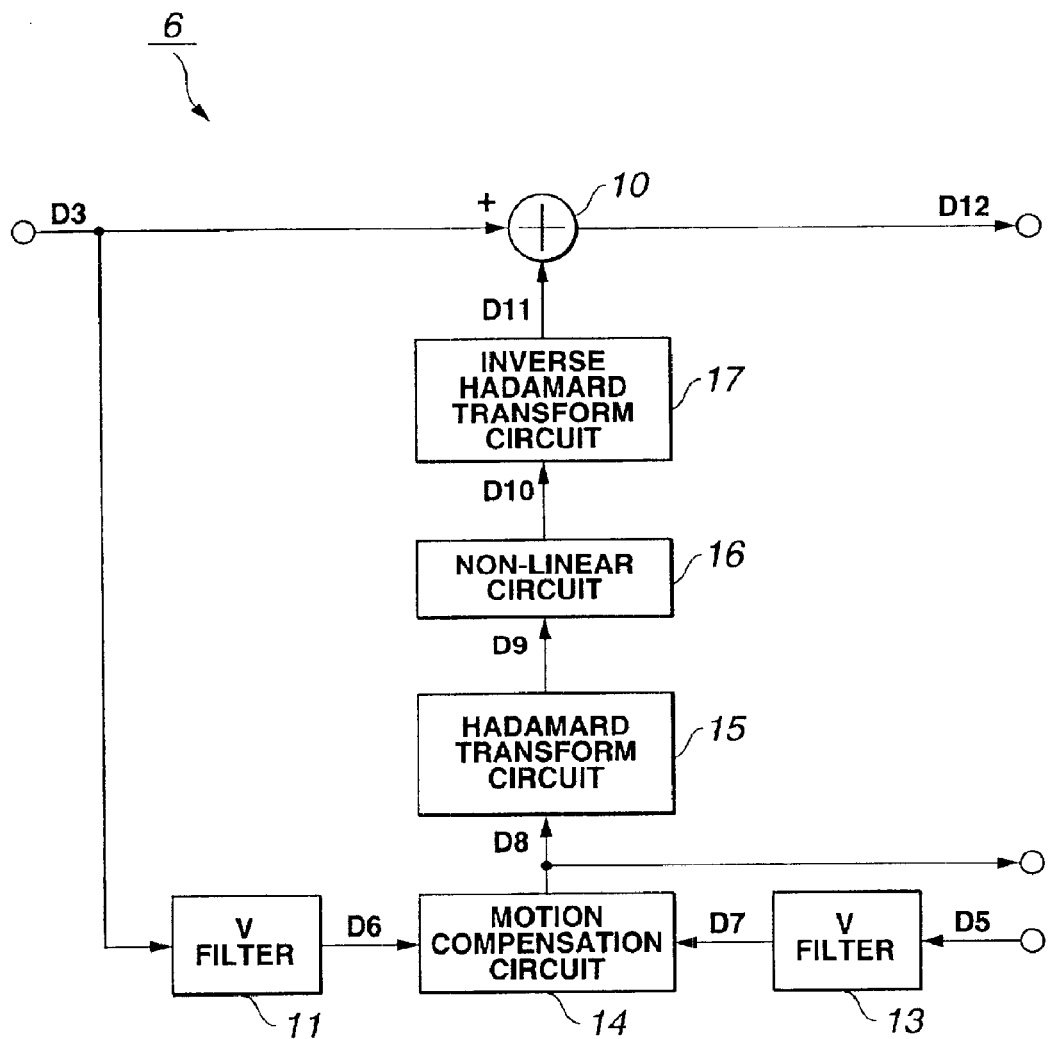
FIG. 3 is a schematic block diagram of the motion compensated field recursive type noise reduction circuit arranged in the noise reduction circuit of FIG. 2.

Now, referring to FIG. 3, the video data D3 is input to subtracter 10 and V filter 11 of the motion compensated field recursive type noise reduction circuit 6. The field-delayed video data D5 obtained by delaying the video data D3 from the field memory 9 of the noise reduction circuit 4 (FIG. 2) by a field is input to V filter 13 of the motion compensated field recursive type noise reduction circuit 6.

The V filter 11 performs an operation of phase compensation on the video data of the interlaced scanning system relative to the field-delayed video D5 in the vertical direction and sends out the obtained video data D6 to motion compensation circuit 14. Similarly, the V filter 13 performs an operation of phase compensation on the field-delayed video data D5 of the interlaced scanning system relative to the video data D3 in the vertical direction and sends out the obtained video data D7 to motion compensation circuit 14.

Figure 4:
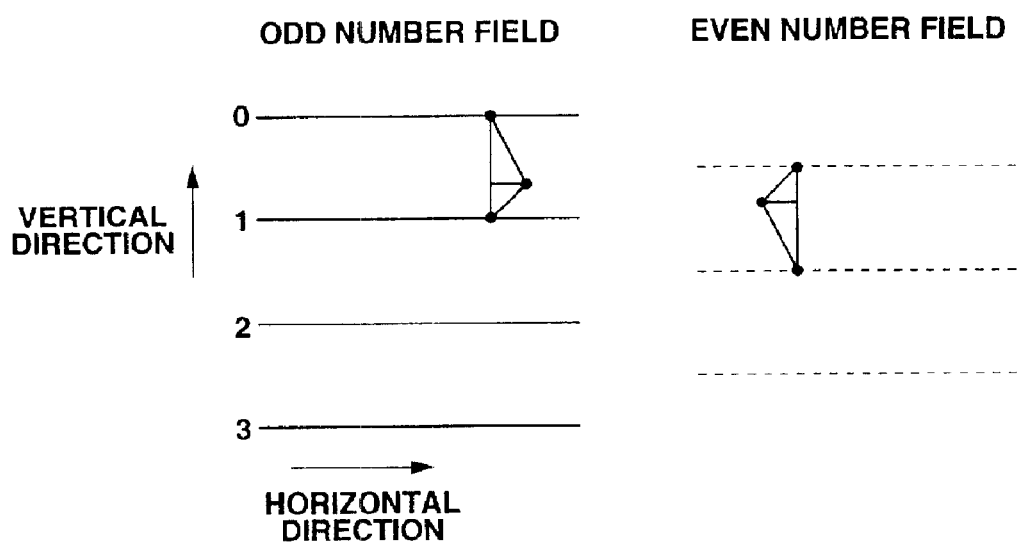
FIG. 4 is a schematic illustration of the operation of phase compensation of the V filter arranged in the motion compensated field recursive type noise reduction circuit of FIG. 3.

More specifically, referring to FIG. 4, on the basis of the pixel values of two pixels of an even number field of the video data D3 having a same phase in the horizontal direction and located on adjacent even number lines, the V filter 11 computes the pixel value of the pixel obtained by dividing the phase of each of the pixels to a predetermined ratio (e.g., 3:1) in the vertical direction. At the same time, on the basis of the pixel values of the two pixels of an odd number field of the field-delayed video data D5 having a same phase in the vertical direction and located on adjacent odd number lines, the V filter 13 computes the pixel value of the pixel obtained by dividing the phase of each of the pixels to a predetermined ratio (e.g., 1:3) in the vertical direction. As a result of the phase compensation, the phase of the video D3 and that of the field-delayed video data D5 are made to agree with each other in the vertical direction.

Referring back to FIG. 3, motion compensation circuit 14 operates as degree of correlation computing means firstly divides the video data D6 into blocks of a predetermined size. Then, the motion compensation circuit 14 extracts one of the blocks as reference block and detects the similarity candidate block that is most similar to the reference block out of a number of candidate blocks found in a predetermined search area of the field-delayed video data D7. Thereafter, it determines the difference between the reference block and the detected similarity candidate block as noise. Subsequently, the motion compensation circuit 14 determines the difference between the similarity candidate block and each of all the remaining blocks in the video data D6 and sends out the obtained data to Hadamard transform circuit 15 and degree of coding difficulty computing circuit 7 (FIG. 2) as motion compensation remaining difference data D8.

The Hadamard transform circuit 15 divides the motion compensation remaining difference data D8 transmitted from the motion compensation circuit 14 into, for instance, eight horizontal frequency components and sends out the motion compensation remaining difference data D9 of each of the horizontal frequency components to non-linear circuit 16. The non-linear circuit 16 comprises a non-linear limiter circuit. It generates noise data D10 of each of the horizontal frequency components by adaptively changing each of the limiter values to be applied to the motion compensation remaining difference data D9 of the horizontal frequency component and limiting the upper limit value of the motion compensation remaining difference data D9 and sends out the obtained data to inverse Hadamard transform circuit 17. Thus, a high limiter value is selected for the motion compensation remaining difference data D9 if its horizontal frequency component is found in a low frequency band because the data can produce noticeable noises, whereas a low limiter value is selected for the motion compensation remaining difference data D9 if its horizontal frequency component is found in a high frequency band because the data can produce only less noticeable noises.

The inverse Hadamard transform circuit 17 transforms the noise data D10 of each of the horizontal frequency components into noise data D11 on the time base and transmits them to the subtracter 10. The subtracter 10 generates noise-reduced video data D12 involving no temporal correlations among different fields by subtracting the noise data D11 from the video data D3 fed from the NTSC decoder 3 (FIG. 1) and sends out the obtained data to multiplexer circuit 8 (FIG. 2).

In this way the motion compensated field recursive type noise reduction circuit 6 reduces the noise in the video data D3 in advance to consequently reduce block distortions that make the boundaries of the blocks discontinuous and linking mosquito noises that appear around the edges.

Figure 5:
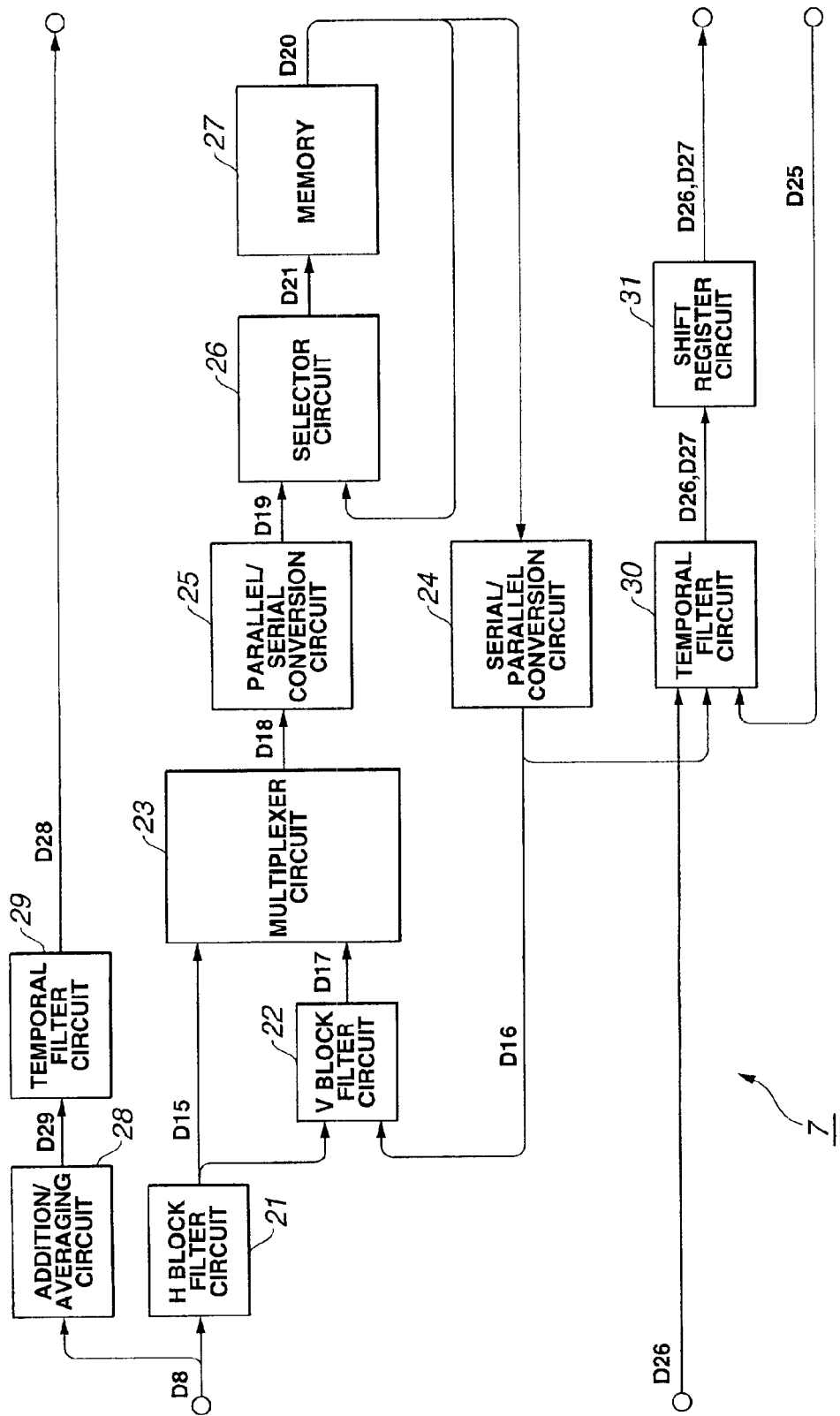
FIG. 5 is a schematic block diagram of the degree of coding difficulty computing circuit arranged in said noise reduction circuit of FIG. 2.

As shown in FIG. 5, the degree of coding difficulty computing circuit 7 inputs the motion compensation remaining difference data D8 supplied from the motion compensated field recursive type noise reduction circuit 6 (FIG. 2) to adding/averaging circuit 28. The adding/averaging circuit 28 adds the motion compensation remaining difference data D8 of a field to obtain the degree of field coding difficulty data D29 for each field. The obtained degree of field coding difficulty data D29 of each field is then input to temporal filter circuit 29 for a filtering operation to be conducted on the time base. The filtering operation is conducted on the time base by using the transfer function F of (1) to generate degree of field coding difficulty data 29;

$$F=(1-K)/(1-K \times Z^{-F}) \quad (1)$$

where K is a constant having a value of 0<K<1 and used to determine the time constant of the filter and $Z^{-F}$ represents a field delay.

Figure 6A:
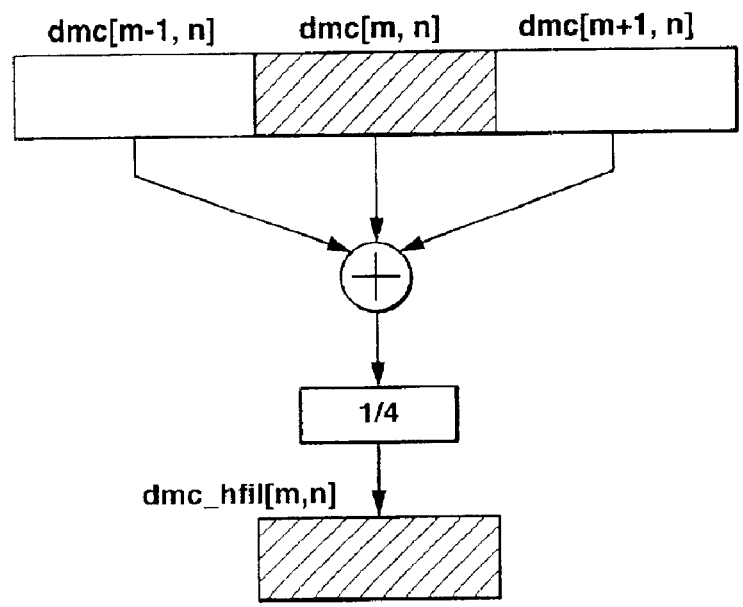
FIG. 6 is a schematic illustration of the horizontal and vertical filtering operation of said motion compensated field recursive type noise reduction circuit of FIG. 3.

The motion compensation remaining difference data D8 are also supplied to H block filter circuit 21. As shown in FIG. 6 (A), the H block filter circuit 21 performs an inter-block filter operation as expressed by formula (2) below on each of the block data dmc [m, n] of the motion compensation remaining difference data D8 to produce motion compensation remaining difference data D15 containing horizontally smoothed block data dmc_hfil [m, n] and sends them to V block filter circuit 22 and multiplexer circuit 23;

$$\text{dmc\_hfil}[m, n] = \frac{dmc[m+1, n] + dmc[m, n] + dmc[m-1, n]}{4} \quad (2)$$

where m represents the horizontal address and n represents the vertical address of each block.

Figure 6B:
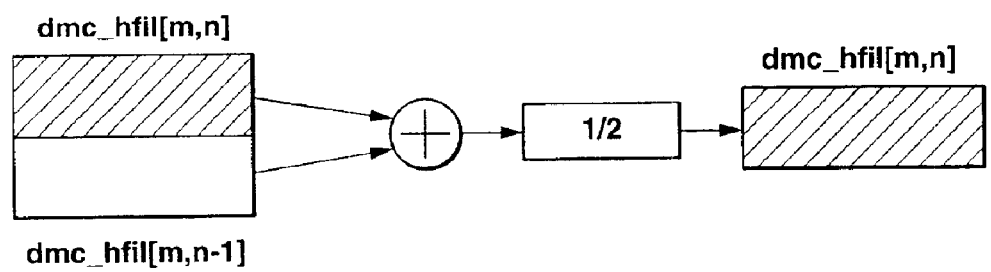

As shown in FIG. 6(B), the V block filter circuit 22 performs a vertical inter-block filtering operation as expressed by formula (3) below on each of the block data dmc_hfil [m, n] of the motion compensation remaining difference data D15 fed from the H block filter circuit 21, using the block data dmc_hfil [m, n−1] contained in the motion compensation remaining difference multiplexed data D16 fed from serial/parallel conversion circuit 24, to generate motion compensation remaining difference data D17 containing vertically smoothed block data dmc_hvfil [m, n] as expressed by formula (4) below and transmit them to the multiplexer circuit 23.

$$\text{dmc\_hvfil}[m, n] = \frac{\text{dmc\_hfil}[m, n] + \text{dmc\_hfil}[m, n-1]}{2} \quad (3)$$

$$\text{dmc\_hvfil}[m, n] = \quad (4)$$
$$\frac{\begin{array}{c}dmc[m+1, n] + dmc[m, n] + dmc[m-1, n] + \\ dmc[m+1, n-1] + dmc[m, n-1] + dmc[m-1, n-1]\end{array}}{8}$$

Figure 6C:
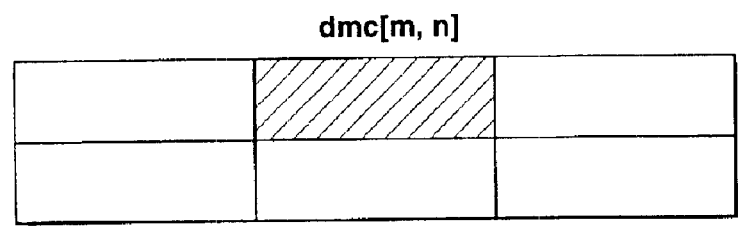

Thus, as shown in FIG. 6(C), the motion compensation remaining difference data D17 are obtained by spatially smoothing each of the block data dmc [m, n] of the motion compensation remaining difference data D8.

Now, referring to FIG. 7, the multiplexer circuit 23 multiplexes the horizontally smoothed motion compensation remaining difference data D15 and the horizontally and vertically smoothed motion compensation remaining difference data D17 for each block and transmits the motion compensation remaining difference data D18 obtained as a result of the multiplexing to parallel/serial conversion circuit 25. The parallel/serial conversion circuit 25 performs an operation of parallel/serial conversion on the 4-bit multiplexed motion compensation remaining difference data and sends out the obtained 1-bit multiplexed motion compensation remaining difference data D19 to selector circuit 26.

The selector circuit 26 switches the multiplexed motion compensation remaining difference data D19 fed from the parallel/serial conversion circuit 25 and the multiplexed motion compensation remaining difference data D20 read out from memory 27 and sends out either of the switched data to the memory 27 as multiplexed motion compensation remaining difference data D21 so that the memory 27 stores the transmitted multiplexed motion compensation remaining difference data D21. Then, the memory 27 reads out the stored multiplexed motion compensation remaining difference data D21 at a predetermined timing and transmits them to the selector circuit 26 and the serial/parallel conversion circuit 24 as multiplexed motion compensation remaining difference data D20. The serial/parallel conversion circuit 24 performs an operation of serial/parallel conversion on the 1-bit multiplexed motion compensation remaining difference data D21 and transmits the obtained 4-bit multiplexed motion compensation remaining difference data D16 to the V block filter circuit 22 and temporal filter circuit 30.

The temporal filter circuit 30 operates as correlation smoothing means to turn the horizontally and vertically smoothed motion compensation remaining difference data of the motion compensation remaining difference data D16 fed from the serial/parallel conversion circuit 24 into dfc_in and also the field-delayed degree of coding difficulty data D25 comprising the motion compensation remaining difference data obtained by delaying the motion compensation remaining difference data dfc_in fed from the field memory 9 (FIG. 2) by a frame into motion compensation remaining difference data dfc_fd and also smooths the motion compensation remaining difference data D8 input to the degree of coding difficulty computing circuit 7 by both horizontally and vertically filtering them on the time base. The obtained data are defined as degree of block coding difficulty data for each block.

More specifically, the temporal filter circuit 30 generates degree of block coding difficulty data tfil by performing a filtering operation on the time base as expressed by formula (5) on the basis of the horizontally and vertically smoothed motion compensation remaining difference data dfc_in and the motion compensation remaining difference data dfc_fd obtained by delaying the motion compensation remaining difference data dfc_in by a field;

$$dif\_fd = dfc\_in - fdc\_fd \quad (5)$$
$$adif\_fd = abs(dif\_fd)$$
case (s_dif_fd)
  0:
    if (adif_fd) > c_tmp_fil_h×2)
      tfil = dfc_fd + c_tmp_fil_h
    else
$$tfil = \frac{dfc\_in + dfc\_fd}{2}$$
  1:
    if (adif_fd) > c_tmp_fil_h×2)
      tfil = dfc_fd - c_tmp_fil_1
    else
$$tfil = \frac{dfc\_in + dfc\_fd}{2}$$

where dif_fd represents the difference data between the motion compensation remaining difference data dfc_in and the motion compensation remaining difference data dfc_fd, adif_fd represents the absolute value of the difference data dif_fd, s_dif_fd represents the code bit of the difference data dif_fd, indicating that the difference data dif_fd is positive when s_dif_fd is 0 and the difference data dif_fd is negative when s_dif_fd is 1, and c_tmp_fil_h and c_tmp_fil_1 represent respective constants.

Thus, the temporal filter circuit 30 selects the average of the motion compensation remaining difference data dfc_in and the motion compensation remaining difference data dfc_fd for the degree of block coding difficulty data tfil when the difference data dif_fd of the horizontally and vertically smoothed motion compensation remaining difference data fdc_in and the motion compensation remaining difference data dfc_fd obtained by delaying the motion compensation remaining difference data dfc_in by a field is found within a predetermined range, whereas it selects the outcome of adding a predetermined constant to or subtracting it from the motion compensation remaining difference data dfc_fd as degree of block coding difficulty data tfil when the difference data dif_fd is found outside the predetermined range.

The degree of coding difficulty computing circuit 7 (FIG. 2) is fed with a scene change data D26 indicating if there is a scene change in the video data D3, which may typically be those of a movie picture or television drama, or not by the scene change detection circuit 5 (FIG. 1) and inputs the supplied scene change data D26 to the temporal filter circuit 30. If the scene change detection circuit 5 outputs 1 as scene change data D26 when it detects a scene change it but outputs 0 in any other occasion.

When transmitting the degree of block coding difficulty data tfil to shift register 31 as degree of block coding difficulty data D27, the temporal filter circuit 30 sends the scene change data D26 on a time division basis in the vertical blanking interval of the degree of block coding difficulty data D27. Then, the shift register 31 temporarily holds the scene change data D26 and the degree of block coding difficulty data D27 and outputs them at a predetermined timing to the multiplexer circuit 8 of the noise reduction circuit 4.

When outputting the noise-reduced video data D12 fed from the motion compensated field recursive type noise reduction circuit 6, the multiplexer circuit 8 multiplexes the noise-reduced video data D12, the scene change data D26, the degree of block coding difficulty data D27 and the degree of field coding difficulty data D28 by outputting the scene change data D26, the degree of block coding difficulty data D27 and the degree of field coding difficulty data D28 in the horizontal blanking interval of the noise-reduced video data D12. Then, it transmits the noise-reduced video data D12, the scene change data D26, the degree of block coding difficulty data D27 and the degree of field coding difficulty data D28 that are multiplexed to and stores them in the field memory 9.

The field memory 9 delays the video data D3 fed from the NTSC decoder 3 by a field and transmits the field-delayed video data D5 to the motion compensated field recursive type noise reduction circuit 6 and the scene change detection circuit 5. It also delays the degree of block coding difficulty data D27 by a field and transmits the field-delayed degree of block coding difficulty data D25 to the degree of coding difficulty computing circuit 7. Additionally, it transmits the field-delayed degree of block coding difficulty data D25, the field-delayed degree of coding difficulty data D28 and the scene change data D26 to adaptive pre-filter 35 (FIG. 1) and causes the noise-reduced video data D12 to be delayed by a field. Finally, it transmits the field-delayed noise-reduced video data D30 to the adaptive pre-filter 35.

In FIG. 8, (A) through (H) show the timings of writing the above data in and reading them from the field memory 9.

Referring to FIG. 8, (A) shows the timing of writing the noise-reduced video data D12 in the field memory 9 and (B) shows the timing of writing the degree of block coding difficulty data D27 in the field memory 9 while (C) shows the timing of writing the degree of field coding difficulty data D28 in the field memory 9 and (D) shows the timing of writing the scene change data D26 in the field memory 9. Similarly, in FIG. 8, (E) shows the timing of reading the field-delayed noise-reduced video data D30 from the field memory 9 and (F) shows the timing of reading the field-delayed degree of coding difficulty data D25 from the field memory 9, while (G) shows the timing of reading the degree of field coding difficulty data D28 from the field memory 9 and (H) shows the timing of reading the scene change data D26 from the field memory 9.

The adaptive pre-filter 35 performs an adaptive pre-filtering operation on the field-delayed noise-reduced video data D30 by using the transfer function H as expressed by formula (6) below on the basis of the field-delayed degree of block coding difficulty data D25, the degree of field coding difficulty data D28 and the scene change data D26 to reduce the volume of information of the field-delayed noise-reduced video data D30 as a function of the temporal correlations of the fields of the field-delayed noise-reduced video data D30. Then, it transmits the noise-reduced video data D31 obtained as a result of the above operation to MPEG encoder 36.

$$H=1-(1-G)\times\alpha$$

$$G=a\times(a\times Z^{-1}+b+a\times Z^{+1})\times Z^{-H}+b\times(a\times Z^{-1}+b+a\times Z^{+1})+a\times(a\times Z^{-1}+b+a\times Z^{+1})\times Z^{+H} \quad (6)$$

Figure 9:
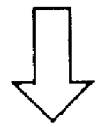
FIG. 9 is a schematic illustration of the filtering operation using transfer function G of the adaptive type pre-filter arranged in said recording/reproduction apparatus of FIG. 1.

As shown in FIG. 9, the transfer function G is adapted to perform a weighted operation of multiplying the pixel values of the pixels surrounding a pixel drawing attention by a predetermined coefficient and adding the obtained product to the pixel value of the pixel drawing attention.

In formula (6), the filter coefficient α is a value within the range of 0 to 1 as determined on the basis of the values of the field-delayed degree of block coding difficulty data D25, the degree of field coding difficulty data D28 and the scene change data D26. More specifically, a value close to 1 is selected for the filter coefficient α if the field-delayed degree of block coding difficulty data D25 and the degree of field coding difficulty data D28 show respective values not lower than a predetermined level and the scene change data D26 shows a value equal to 0, whereas a value of 0 is selected for the filter coefficient α if the field-delayed degree of block coding difficulty data D25 and the degree of field coding difficulty data D28 show respective values not higher than a predetermined level and the scene change data D26 shows a value equal to 0. However, a value of 0 is compulsively selected for the filter coefficient α regardless of the value of the field-delayed degree of block coding difficulty data D25 and that of the degree of field coding difficulty data D28 if the the value of the scene change data D26 is equal to 1.

FIG. 12 is a schematic illustration of the relationship between the filter coefficient α and the degree of block coding difficulty data D25 that can be used for the purpose of the invention. In other words, the filter coefficient α is controlled in a manner as shown in FIG. 12 according to a function of the degree of block coding difficulty data obtained on a block by block basis. In FIG. 12, a table number (Tab. No.) of an optimally selected table is selected as a function of the value of the degree of field coding difficulty data D28 shown in FIG. 13 for each image transmission rate. For example, if the image transmission rate is 4 Mbps and the value of the degree of field coding difficulty data D28 obtained for each field is 14, a table number (Tab. No.) of 15 is selected. Then, according to the selection of table number (Tab. No.) 15, the filter coefficient α is controlled by the degree of block coding difficulty data D25 obtained for each block of the scene.

Figure 10:
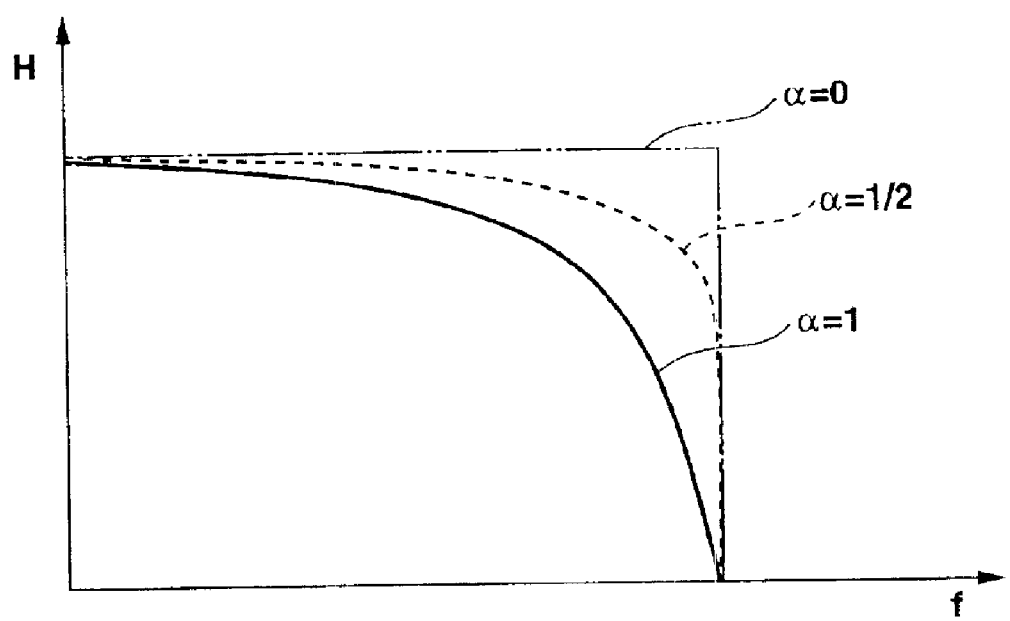
FIG. 10 is a schematic illustration of the filtering operation using transfer function H of the adaptive type pre-filter arranged in said recording/reproduction apparatus of FIG. 1.

Thus, as shown in FIG. 10, the adaptive pre-filter 35 adaptively filters the field-delayed noise-reduced video data D30 by selecting a value close to 1 for the filter coefficient for a field and a domain showing a low temporal correlation to reduce the volume of information for the high frequency component of the field and a value close to 0 for the filter coefficient for a field and a domain showing a high temporal correlation so as not to reduce the volume of information for the high frequency component of the field. With this arrangement, the volume of information of the compressed video data D36 received by the downstream MPEG encoder 36 is held to a constant level.

Thus, if the volume of information of the compressed video data D36 is expected to increase because the inter-field temporal correlation is low, the adaptive pre-filter 35 reduces the volume of information of the high frequency component that does not noticeably degrade the image quality to the sight of the viewer if reduced before compression-coding the field-delayed noise-reduced video data D30 in order to hold the volume of information of the compressed video data D36 to a constant level.

At this time, the adaptive pre-filter 35 forcibly select 0 for the filter coefficient α for a field that does not have any temporal correlation with the field showing an image change or the immediately preceding field so that no information of the field may omitted. As a result, the recording/reproduction apparatus 1 is left free from degrading any video data that comes immediately after a scene change when compression-coding and expansion decoding the noise-reduced video data D31 produced by the adaptive pre-filter 35.

The MPEG encoder 36 performs a compression-coding operation on the noise-reduced video data D31 according to the DCT (Discrete Cosine Transform) coding system to transmit compression-coded data D32 including coded information such as that of quantization scale added to the video data to ECC (Error Correcting Circuit) encoder 37.

The ECC encoder 37 adds an error correction code to the compressed video data D32 and transmits the compressed video data D33 including the error correction code to 8-14 modulation circuit 38. The 8-14 modulation circuit 38 modulates the compressed video data D33 according to a predetermined 8-14 modulation system and transmits the obtained compressed video data D34 to RF amplifier 39. The RF amplifier 39 amplifies the compressed video data D34 to a predetermined level. Then, the obtained compressed video data D35 are recorded on an optical disc 41 by way of an optical pickup 40.

For data reproducing operation, the recording/reproduction apparatus 1 reproduces the compressed video data D40 from the optical disc 41 by way of the optical pickup 40 and transmits them to the RF amplifier 45. The RF amplifier 45 amplifies the compressed video data D40 to predetermined level and transmits the obtained compressed video data D41 to 8-14 demodulation circuit 46. The 8-14 demodulation circuit 46 demodulates the compressed video data D41 according to a predetermined 8-14 demodulation system and transmits the obtained compressed video data D41 to ECC decoder 47.

The ECC decoder 47 performs an error correcting operation, using the error correction code added by the ECC encoder 37 and the obtained compressed video data D43 to MPEG decoder 48. The MPEG decoder 48 performs an expansion-decoding operation on the compressed video data D43 to restore the original video data D44 and transmits the restored video data D44 to noise reduction circuit 49. At this time, the MPEG decoder 48 extracts coding data D45 such as quantization scale and transmits the extracted coding data D45 also to the noise reduction circuit 49.

The noise reduction circuit 49 reduces the block distortions and the mosquito noises produced in the video data D44 by conducting a filtering operation on the video data D44, using the coding information D45 and transmits the obtained video data D46 to image quality correction circuit 50. Like the noise reduction circuit 4 of the recording system, the noise reduction circuit 49 of the reproduction system computationally determines the degree of field coding difficulty data D50 for each block and also the degree of field coding difficulty data D51 for each field and transmits them to adaptive image quality correction circuit 50.

The adaptive image quality correction circuit 50 adaptively performs an image quality correcting operation on the video data D46, using transfer function H as expressed by formula (7), on the basis of the degree of field coding difficulty data D50 and the degree of field coding difficulty data D51.

$$H=1+(1-G)\times\alpha$$

$$G=a\times(a\times Z^{-1}+b+a\times Z^{+1})\times Z^{-H}+b\times(a\times Z^{-1}+b+a\times Z^{+1})+a\times(a\times Z^{-1}+b+a\times Z^{+1})\times Z^{+H} \quad (7)$$

The relationship between the filter coefficient α and the degree of block coding difficulty data for the recording system illustrated in FIGS. 12 and 13 also applies to the reproduction system. Thus, the filter coefficient α is controlled by the value of the degree of block coding difficulty data obtained for each block in a manner as shown in FIG. 12. In FIG. 12, a table number (Tab. No.) of an optimally selected table is selected as a function of the value of the degree of field coding difficulty data D28 shown in FIG. 13 for each image transmission rate. For example, if the image transmission rate is 4 Mbps and the value of the degree of field coding difficulty data D51 obtained for each field is 14, a table number (Tab. No.) of 15 is selected. Then, according to the selection of table number (Tab. No.) 15, the filter coefficient α is controlled by the degree of block coding difficulty data D50 obtained for each block of the scene. Note that the table used in the reproduction system may well show characteristics different from those of the table used for the recording system as shown in FIGS. 12 and 13 without any problem. Additionally, the parameter to be used for controlling the degree of coding difficulty in the image quality operation is not limited to the filter coefficient α and the frequency characteristics of the filter and/or the core ring level may also be used as additional parameters.

The adaptive image quality correcting circuit 50 sends out the video data D47 obtained as a result of the adaptive image quality correcting operation to NTSC encoder 51. The NTSC encoder 51 converts the video data D47 into NTSC video data D48 and transmits the obtained NTSC video data D48 to digital/analog (D/A) conversion circuit 52. The D/A conversion circuit 52 performs an operation of digital/analog conversion on the NTSC video data D48 and transmits the obtained video signal S49 to the outside.

Referring to FIG. 1, operation input section 55 comprises switches including a switch for selecting if an operation of reducing the block distortions is to be carried out or not and one for controlling the operation of image correction and adapted to generate input data D55 in response to the input operation on the part of the user and transmit the generated input data D55 to control circuit 56. The control circuit generates control data D56 on the basis of the input data D55 fed from the operation input section 55 and sends out the generated control data D56 to the noise reduction circuit 49 and the image quality correction circuit 50 to control the operation of the noise reduction circuit 49 and that of the image quality correction circuit 50.

With the above arrangement, the scene change detection circuit 5 detects the scene change, if any, contained in the video data D3 fed from the NTSC decoder 3 by analysing the correlation between the video data D3 and the field-delayed video data D5 obtained by delaying the video data D3 by a field and transmits scene change data D26 indicating if there is a scene change or not to the adaptive pre-filter 35.

The noise reduction circuit 4 analyses the correlation between the video data D3 and the field-delayed video data D5 and generates motion compensation remaining difference data D8. Subsequently, it smooths the generated motion compensation remaining difference data D8 both horizontally and vertically on the time base to generate degree of field coding difficulty data D25 and transmits the generated data to the adaptive pre-filter 35.

The adaptive pre-filter 35 reduces the amount of information of each field image constituting the field-delayed noise-reduced video data D30 by raising the degree of band limiting for removing unnecessary frequency components from each field image showing a low correlation with and lowering the degree of band limiting for removing unnecessary frequency components from each field image showing a high correlation with the field image of the immediately preceding field but forcibly reducing the degree of band limiting for each field image showing no correlation with the field image of the immediately preceding field because of a scene change out of the field images of the field-delayed noise-reduced video data D30 fed sequentially from the noise reduction circuit 4 on the basis of the field-delayed degree of field coding difficulty data D25 and the scene change data D26 fed to it.

While the timing of reading out the data to be fed to each of the scene change detection circuit 5, the motion compensated field recursive type noise reduction circuit 6, the degree of coding difficulty computing circuit 7 and the adaptive pre-filter 35 by using the field memory 9 is described for the above embodiment, the present invention is by no means limited thereto and the timing of reading the data to be fed to each of the above circuits may alternatively be controlled by means of a frame memory.

In FIG. 1, (A) through (H) show the timings of writing the above data in and reading them from the frame memory. Referring to FIG. 11, (A) shows the timing of writing the noise-reduced video data D12 in the frame memory and (B) shows the timing of writing the degree of block coding difficulty data D27 in the frame memory while (C) shows the timing of writing the degree of frame coding difficulty data D28 in the frame memory and (D) shows the timing of writing the scene change data in the frame memory. Similarly, in FIG. 11, (E) shows the timing of reading the frame-delayed noise-reduced video data D12 from the frame memory and (F) shows the timing of reading the frame-delayed degree of block coding difficulty data from the frame memory, while (G) shows the timing of reading the frame-delayed degree of coding difficulty data from the frame memory and (H) shows the timing of reading the scene change data D26 from the frame memory.

While the degree of coding difficulty data is computed from the motion compensation remaining difference data in the above embodiment, the degree of coding difficulty data may alternatively be computed by determining the difference value of the vectors of adjacent blocks and synthesizing the difference of vectors and the motion compensation remaining difference.

Additionally, while a noise reduction circuit, an adaptive pre-filter circuit and an adaptive image quality correction circuit are provided independently in the recording system and in the reproduction system of the above embodiment, the same circuits may be used for the both systems if a recording (coding) operation and a reproduction (decoding) operation are not conducted simultaneously.

Still additionally, while the above embodiment of the present invention is applied to a recording/reproduction apparatus 1 in the above description, the present invention is not limited thereto and can be equally applied a video data processing apparatus that is designed to adaptively filter the video data to be compression-coded and performs an adapted image quality correcting operation on the image data after expansion-decoding the video data.

Figure 14:
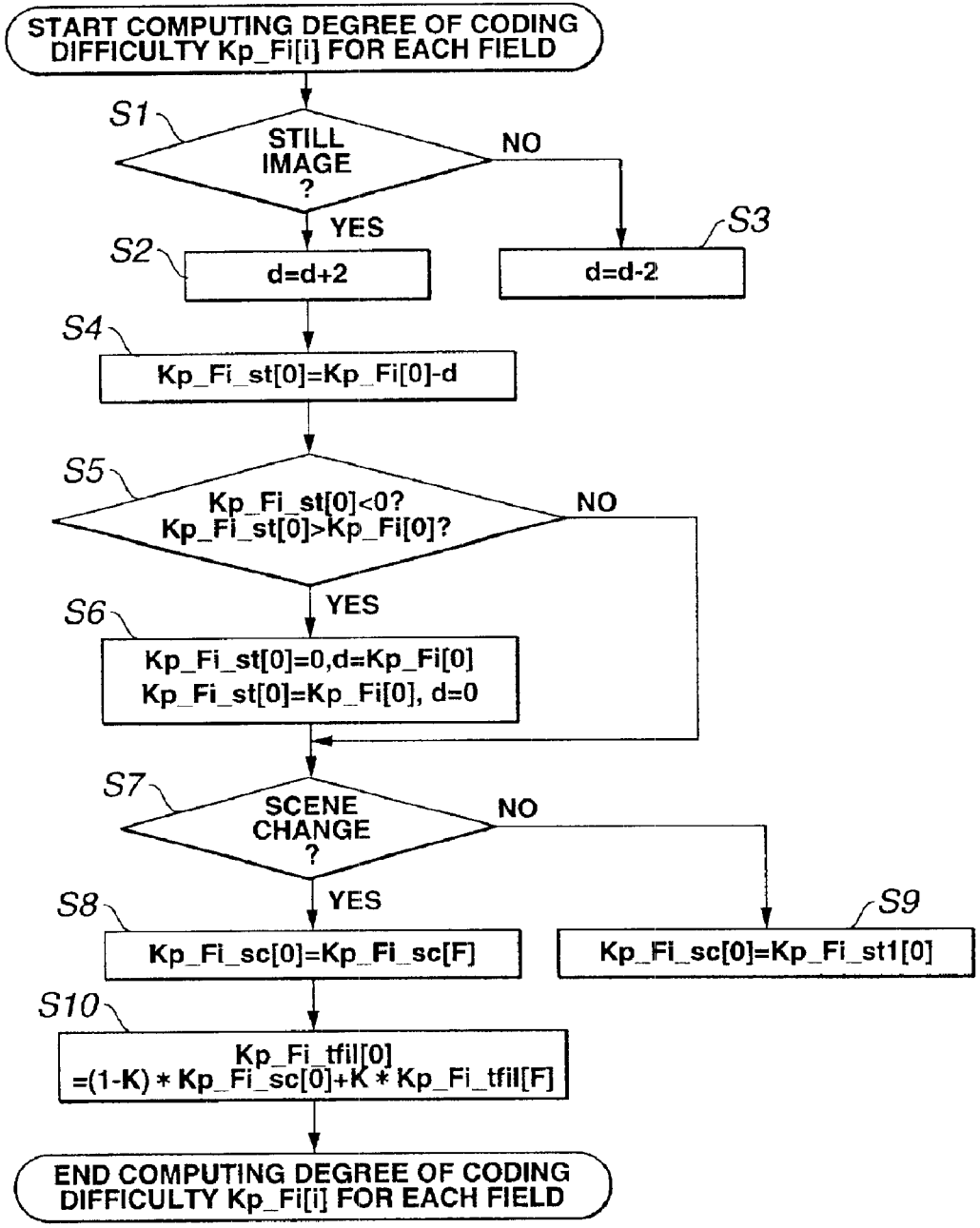
FIG. 14 is a flow chart of the processing operation of detecting a still image, detecting a scene change and a time base filtering operation conducted in the course of computing the degree of coding difficulty of each field.
Figure 16:
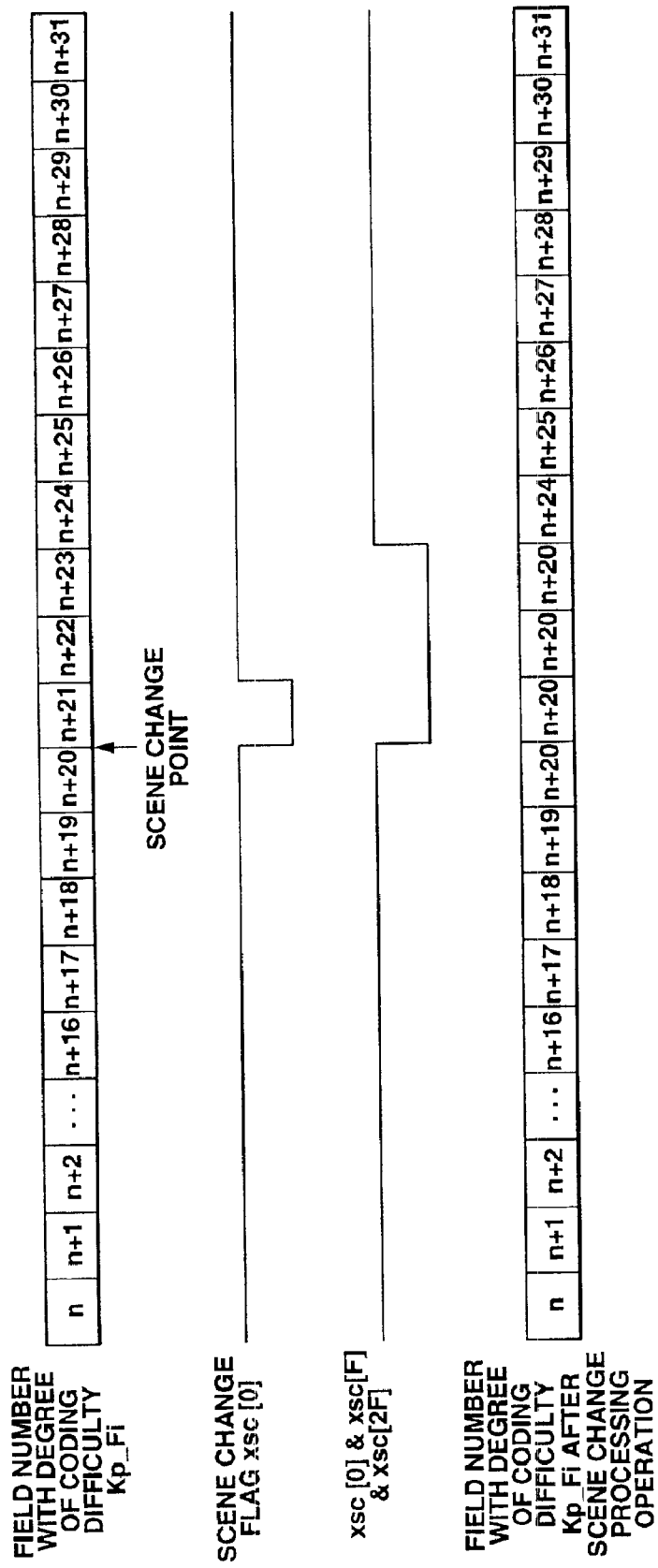
FIG. 16 is a timing chart illustrating the change in the degree of coding difficulty after an operation of processing a scene change.

Now, an operation of detecting a still image and a scene change in the process of computing the degree of coding difficulty Kp_Fi for each field before a filtering operation on the time base for the purpose of the invention will be described by referring to FIGS. 14, 15 and 16.

Firstly in Step S1, it is determined if the input image is a still image or not. The input image is determined to be a still image when the degree of coding difficulty Kp_Fi keeps a same or similar value for a plurality of fields.

If it is determined in Step S1 that the input image is a still image, the operation proceeds to Step S2, where a constant, e.g., 2, is added to the attenuated value d of degree of coding difficulty. If, on the other hand, it is determined in Step S1 that the input image is not a still image, the operation proceeds to Step S3, where the constant of 2 is subtracted from the attenuated value d of degree of coding difficulty.

FIG. 15 shows a timing chart of this operation. Referring to FIG. 15, the input image is determined to be a still image when the degree of coding difficulty Kp_Fi for each field remains same for consecutive sixteen fields. If the still image continues from field number [n+1] to field number [n+23], constant 2 is added to the attenuated value d of degree of coding difficulty from the field number [n+16]. If it is assumed that the degree of coding difficulty Kp_Fi [0] is constantly equal to 10 for the purpose of simplicity, the attenuated value d of degree of coding difficulty is 10 from field number [n+20] to field number [n+23]. If it is determined that the input image is no longer a still image from field number [n+24], the attenuated value d of degree of coding difficulty will be counted down therefrom.

In Step S4, the attenuated value d of degree of coding difficulty is subtracted from the degree of coding difficulty Kp_Fi for each field.

Then, in Steps S5 and S6, the outcome of the subtraction Kp_Fi_stl in Step S4 is restricted so as not to become negative. More specifically, it is determined in Step S5 if the outcome of the subtraction Kp_Fi_stl [0] is smaller than 0 or not and, if the outcome of the subtraction Kp_Fi_stil [0] is smaller than 0, Kp_Fi_stl [0]=0 and d=Kp_Fi [0] are made to hold true in Step S6. It is also determined in Step S5 if the outcome of the subtraction Kp_Fi_stl [0] is greater than the degree of coding difficulty KP_Fi [0] or not and, if the outcome of the subtraction Kp_Fi_stl [0] is greater than the degree of coding difficulty Kp_Fi [0], Kp_Fi_stl [0]=$Kp_{\_Fi}$ [ 0] and d=0 are made to hold true in Step S6.

Then, in Step S7, it is determined if a scene change point is present or not. The flag xsc [0] for indicating the outcome of the judgment on a scene change point falls down to level Low for a field after a scene change point. Then, the flag xsc [0] is expanded on the time base by a logical multiplication operation of the flag xsc [F] of the immediately preceding field and the flag xsc [2F] of the field preceding the current field by two and a scene change signal xsc [0] & xsc [F] & xsc [2F] is produced to indicate that the three fields immediately succeeding the scene change point are held to level Low.

If the scene change signal xsc [0] & xsc [F] & xsc [2F] is at level Low and hence the outcome of the judgement in Step S7 is YES, a processing operation for a scene change is performed and the degree of scene change coding difficulty Kp_Fi_sc [F] of the immediately preceding frame is maintained in Step S8. If, on the other hand, the scene change signal xsc [0] & xsc [F] & xsc [2F] is at level High and hence the outcome of the judgement in Step S7 is NO, the operation proceeds to Step S9, where the degree of coding difficulty Kp_Fi_stl [0] after the still image processing operation is made equal to the degree of coding difficulty Kp_Fi_sc [0] after the scene change processing operation.

Then, in Step S10, a filtering operation is conducted on the time base by using the above degree of scene change coding difficulty Kp_Fi_sc [0], Kp_Fi_sc [F] and the transfer function F of formula (1).

While FIGS. 12 and 13 show an instance of real time transmission, where the adaptive processing operation that is conducted as a function of image transmission rate, it may be needless to say that the adaptive processing operation may be conducted adaptively as a function of the image compression rate because the image transmission rate and the image compression rate show an invariable relationship.

In the case of non-real time transmission, an adaptive control operation will be conducted as a function of the image compression rate instead of the image transmission rate.

For example, the recording/reproduction apparatus 1 of FIG. 1 uses an optical disc drive for an optical disc. An example of non-real time transmission may be an occasion where a hard disc drive is used and the MPEG compression ratio of the MPEG encoder and the MPEG decoder is different from the recording/reproduction rate of the hard disc. Then, the difference between the compression ratio and the recording/reproduction rate is absorbed by the MPEG encoder, the modulation circuit, the demodulation circuit and the buffer memory in the MPEG decoder. If such is the case, the arrangement may be modified in such a way that the hard disc unit and the MPEG encoder and the MPEG decoder are connected by way of a digital transmission system or the hard disc unit is replaced by a semiconductor memory.

What is claimed is:

1. A video data processing device comprising:
   a degree of coding difficulty computing means for computing the degree of coding difficulty from the input video data comprising a motion compensation remaining difference computing means for computing a motion compensation remaining difference and computing the degree of coding difficulty on the basis of the motion compensation remaining difference; the motion compensation remaining difference being computed as a difference between a V-filtered and motion compensated block of the input video data and an original corresponding block of the input video data;
   a filtering means for adaptively filtering said input video data using a transfer function on the basis of the degree of coding difficulty computed from said input data;
   a compression-coding means for compression-coding said input and filtered video data;
   a decoding means for decoding said compression-coded video data;
   a degree of coding difficulty computing means for computing the degree of coding difficulty from said decoded video data; and
   an image quality correcting means for adaptively correcting the image quality of said decoded video data using a transfer function on the basis of the degree of coding difficulty computed from said decoded video data.

2. The video data processing device according to claim 1, wherein said motion compensation remaining difference computing means computes the motion compensation remaining difference on a block by block basis.

3. The video data processing device according to claim 1, wherein said motion compensation remaining difference computing means computes the motion compensation remaining difference on a scene by scene basis.

4. The video data processing device according to claim 1, wherein said motion compensation remaining difference computing means comprises a means for computing the motion compensation remaining difference on a block by block basis and a means for computing the motion compensation remaining difference on a scene by scene basis.

5. The video data processing device according to claim 1, wherein said filtering means adaptively performs a filtering operation on the basis of the coding compression ratio and the degree of coding difficulty as computed from said input video data.

6. The video data processing device according to claim 1, further comprising:
a recording/reproduction means for recording/reproducing compression-coded video data by way of a recording medium; and
said decoding means being adapted to decode the video data reproduced from said recording medium by said recording/reproduction means.

7. The video data processing device according to claim 1, wherein said degree of coding difficulty computing means comprises a motion vector difference computing means for computing the difference of motion vectors in adjacent block and computes the degree of coding difficulty on the basis of the motion vector difference computed by said motion vector difference computing means.

8. The video data processing device according to claim 7, wherein said motion vector difference computing means computes the motion vector difference on a block by block basis.

9. The video data processing device according to claim 7, wherein said motion vector difference computing means computes the motion vector difference on a scene by scene basis.

10. The video data processing device according to claim 7, wherein said motion vector difference computing means comprises a means for computing the motion vector difference on a block by block basis and a means for computing the motion vector difference on a scene by scene basis.

11. A video data processing method comprising steps of:
computing the degree of coding difficulty on the basis of a motion compensation remaining difference computed from the input video data; the motion compensation remaining difference being computed as a difference between a V-filtered and motion compensated block of the input video data and an original corresponding block of the input video data;
adaptively filtering said input video data using a transfer function on the basis of the degree of coding difficulty computed from said input data;
compression-coding said input and filtered video data;
decoding said compression-coded video data; and
computing the degree of coding difficulty from said decoded video data; and
adaptively correcting the image quality of said decoded video data using a transfer function on the basis of the degree of coding difficulty computed from said decoded video data.

12. The video data processing method according to claim 11, wherein the difference of motion vectors in adjacent block is computed from the video data in said degree of coding difficulty computing step and the degree of coding difficulty is computed on the basis of the computed motion vector difference.

13. The video data processing method according to claim 11, wherein the motion compensation remaining difference and the difference of motion vectors in adjacent block are computed from the video data in said degree of coding difficulty computing step and the degree of coding difficulty is computed on the basis of the computed motion compensation remaining difference and the computed motion vector difference.

14. The video data processing method according to claim 11, wherein a filtering operation is adaptively performed on said input video data on the basis of the coding compression ratio and the degree of coding difficulty as computed from said input video data in said filtering step.

15. The video data processing method according to claim 11, further comprising:
a step of recording/reproducing compression-coded video data by way of a recording medium; and
the video data reproduced from said recording medium in said recording/reproducing step being decoded in by said recording/reproduction means.

16. A video data processing device comprising:
a degree of coding difficulty computing means for computing the degree of coding difficulty on the basis of a motion compensation remaining difference computed from the input video data; the motion compensation remaining difference being computed as a difference between a V-filtered and motion compensated block of the input video data and an original corresponding block of the input video data;
a filtering means for adaptively filtering said input video data using a transfer function on the basis of the degree of coding difficulty computed from said input data and the compression ratio;
a compression-coding means for compression-coding said input and filtered video data;
a decoding means for decoding said compression-coded video data;
a degree of coding difficulty computing means for computing the degree of coding difficulty from said decoded video data; and
an image quality correcting means for adaptively correcting the image quality of said decoded video data using a transfer function on the basis of the degree of coding difficulty computed from said decoded video data and the compression ratio.

17. A video data processing method comprising steps of:
computing the degree of coding difficulty on the basis of a motion compensation remaining difference computed from the input video data; the motion compensation remaining difference being computed as a difference between a V-filtered and motion compensated block of the input video data and an original corresponding block of the input video data;
adaptively filtering said input video data using a transfer function on the basis of the degree of coding difficulty computed from said video data and the compression ratio;
compression-coding said input and filtered video data;
decoding said compression-coded video data;
computing the degree of coding difficulty from said decoded video data; and
adaptively correcting the image quality of said decoded video data using a transfer function on the basis of the degree of coding difficulty computed from said decoded video data and the compression ratio.

18. A video data processing device, comprising:
noise reduction means for reducing noise in an input video data, including:
motion compensation means for generating a motion compensation remaining difference data on the basis of said input video data;
degree of coding difficulty computing means for computing a degree of field coding difficulty data and a degree of block coding difficulty data for the input video data on the basis of the motion compensation remaining difference; and field memory means for field delaying said degree of block coding difficulty data to produce a field-delayed degree of block coding difficulty data;

filtering means for adaptively filtering the noise-reduced input video data using a transfer function on the basis of the degree of field coding difficulty data and the field-delayed degree of block coding difficulty data; and compression-coding means for compression-coding the adaptively-filtered input video data.

19. The video data processing device according to claim 18, further comprising a scene change detection means for detecting scene changes in the input video data to produce a scene change data; and said filtering means adaptively filters the noise-reduced input video data using a transfer function on the basis of the degree of field coding difficulty data, the field-delayed degree of block coding difficulty data, and the scene change data.

20. A video data processing method, comprising the steps of:

reducing noise in an input video data, by:

generating a motion compensation remaining difference data on the basis of said input video data;

computing a degree of field coding difficulty data and a degree of block coding difficulty data for the input video data on the basis of the motion compensation remaining difference; and field delaying said degree of block coding difficulty data to produce a field-delayed degree of block coding difficulty data;

adaptively filtering the noise-reduced input video data using a transfer function on the basis of the degree of field coding difficulty data and the field-delayed degree of block coding difficulty data; and compression-coding the adaptively-filtered input video data.

21. The video data processing method according to claim 20, further comprising a step of detecting scene changes in the input video data to produce a scene change data; and said adaptive filtering step adaptively filters the noise-reduced input video data using a transfer function on the basis of the degree of field coding difficulty data, the field-delayed degree of block coding difficulty data, and the scene change data.

* * * * *